Patented Jan. 1, 1924.

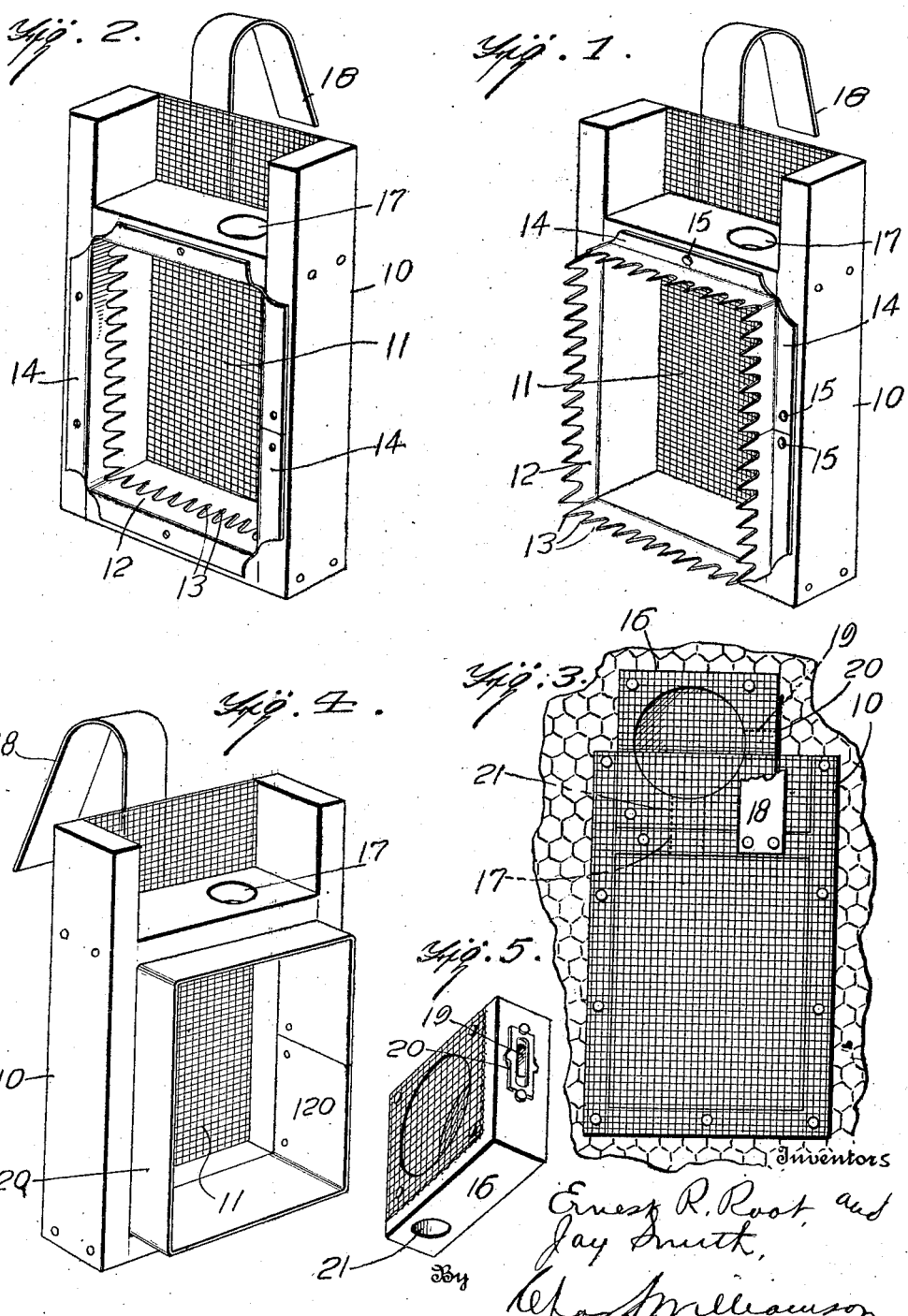

1,479,751

UNITED STATES PATENT OFFICE.

JAY SMITH, OF VINCENNES, INDIANA, AND ERNEST R. ROOT, OF MEDINA, OHIO.

QUEEN-INTRODUCING DEVICE.

Application filed April 20, 1921. Serial No. 463,065.

*To all whom it may concern:*

Be it known that we, JAY SMITH and ERNEST R. ROOT, residing at Vincennes, county of Knox, State of Indiana, and Medina, county of Medina, State of Ohio, respectively, citizens of the United States, have invented certain new and useful Improvements in Queen-Introducing Devices, of which the following is a specification.

Our invention relates to the art of bee keeping and particularly to the matter of the introduction of queens to hives or colonies, and our object is to enable the introduction of queens to be effected with little or no loss and to do so by a device at once simple and easily manipulated and which will possess other advantages that will be appreciated by those skilled in the art from what follows in this specification. Our invention consists in the introducing means having the characterstics of construction described by or included within the language or scope of the appended claims.

In the accompanying drawings:

Fig. 1 is a perspective view of a queen introducing cage embodying our invention when arranged for application to comb;

Fig. 2 is a similar view when arranged for shipment;

Fig. 3 is a view showing the device applied to the comb and with a supplemental cage associated therewith for the passage of bees into the introducing cage;

Fig. 4 is a perspective view of a different embodiment of my invention;

Fig. 5 is a perspective view of the reception cage detached.

Our invention pertains to that method of queen introduction which employs a cage that is applied to the side of the comb so that the queen and any escort bees with her may have such contact with the comb as to receive the characteristic colony odor which is necessary to assure the reception of the queen by the colony and which will protect her from the bees of the colony during the time required to prepare her for favorable reception by them.

The cage shown in the drawings consists of a rectangular frame, 10, whose four sides are of wood in the form of strips nailed together and upon one side of the frame is attached a piece or sheet, 11, of woven wire that covers one side of the frame, the other side of the frame being open and being the side which is towards or next the comb, so that the queen while within the cage has access to the comb and while visible to the bees and accessible to them for feeding, if they are so disposed, through the meshes of the wire cloth, she cannot be reached by them for balling, which is one of the dangers to which a strange queen in a hive is exposed.

Upon each edge of the frame, 10, at the side next the comb is a strip, 12, of tin or other sheet metal whose outer edge is preferably formed or cut into a series of teeth or sharp points, 13, of a length to penetrate into the comb far enough to assure the secure attachment of the cage to the comb and to prevent the presence of any openings through which bees might pass into the cage to get at the queen. Each strip has an outturned flange, 14, at right angles to the strip and provided with holes for nails, 15, or other fastening devices by which the strip is attached to the frame, and preferably all four strips are made of a single piece which after the formation of the teeth or points as by means of dies, is bent to the rectangular shape desired. The dimensions of the open frame-like structure which the strips thus made constitute, are such on diametral lines that the strips, point inwards may be slid or telescoped into the open frame, 10, and thus for shipment purposes the sharp points or teeth are guarded so that the exterior of the cage is smooth or free from sharp projections. The arrangement for shipping purposes is shown in Fig. 2.

At one of the shorter ends of the cage the frame sides are extended beyond the cross piece at such end, thus enabling the insertion into such end of one end of a supplemental cage which may be a shipping cage, of well known construction, so that the usual exit hole in the shipping cage may be placed in juxtaposition to a hole or opening, 17, in said frame cross piece and the queen and any escort bees within the shipping cage may then readily pass into the introducing cage. When the shipping cage is thus applied to the introducing cage it is maintained in position by the lapping of the projections or extensions of the sides of the frame, 10, alongside the inserted portion of the shipping cage.

To add to the security of the attachment of the cage to the comb, means to support it from falling away from the comb may be provided, such, for example, as the spring finger, 18, attached to the frame, 10, so that the free end of the finger may bear against the comb in an adjacent frame.

Instead of the usual shipping cage, a special cage constructed substantially the same as a shipping cage is preferably used and which, for convenience, we term a "reception cage," and which is shown in Figs. 3 and 5 of the drawings. As shown in Fig. 5, the reception cage, 16 has in one of its sides that is exposed when the cage is applied, as shown in Fig. 3, an opening, 19, which, during the introducing process, is reduced in size by a queen excluder, 20, so that while allowing free passage of the worker bees, will prevent the escape or exit of the queen. It will be understood that during shipment or before application of the cage, 16, as shown in Fig. 3, the hole, 21, leading from the cage, 16, into the introducing cage is closed with a removable stopper. The hole, 19, having the queen excluder, 20, is closed to the passage of worker bees, say for two days, so that bees belonging to the colony cannot at first enter the enclosure containing the queen.

While the sheet metal penetrating member preferably has sharp points or teeth for entering the comb, yet, as shown in Fig. 4, no teeth or points may be used, the smooth edges of the sheet metal penetrating member, 120, being sharp enough to readily enter or penetrate the comb. The comb penetrating member, whether of the form shown in Fig. 4 or having the teeth or points, extends sufficiently far into the comb as to impose an obstacle to the bees of the colony gnawing through the comb and providing an opening into the interior of the introducing cage through which the queen might prematurely be released. The advantage of the teeth is that when the device is applied to the comb the teeth become embedded in the cocoons in the bottom of the cells, and thereby the device is securely anchored.

What we claim is:

1. In a device of the kind described, a cage having on its side that lies next the comb when in use, comb penetrating points that have sides of substantial area that form an obstacle to bees.

2. In a device of the kind described, a cage comprising a frame having an open side that is situated next the comb when in use, and a series of comb penetrating points at such side of the frame and projecting from each of the frame sides such points having sides of substantial area that form an obstacle to bees.

3. In a device of the kind described, a cage comprising a frame that is open on the side that lies next the comb when in use, and a sheet metal strip or strips having a series of serrations attached to the frame at its open side, said serrations providing a series of comb-penetrating points.

4. In a device of the kind described, a cage comprising a frame that is open on the side that lies next the comb when in use, and a sheet metal strip or strips having a series of serrations attached to the frame at its open side, said serrations providing a series of comb-penetrating points, the serrated portion of the strip or strips and the frame interior having such relative sizes that the serrated portion of the strip or strips may be telescoped into the frame.

5. In a device of the kind described, a cage comprising a rectangular frame open on one side, a serrated strip of sheet metal along each of the four sides of the frame, and frame-engaging flanges on the strips.

6. In a device of the kind described, a cage comprising a rectangular frame open on one side, a serrated strip of sheet metal along each of the four sides of the frame, and frame-engaging flanges on the strips, these serrated portions on the strips being insertible within the frame.

7. In a device of the kind described, a cage comprising a frame having an open side situated next to the comb when in use, and a thin stiff comb penetrating member projecting from the open side of such frame and having side surfaces of extended area that forms an obstacle to bees.

8. In a device of the kind described, a cage comprising a frame having an open side situated next to the comb when in use, a thin stiff comb penetrating member projecting from the open side of such frame, and a spring finger projecting from the outer side of said cage.

9. In a device of the kind described, a cage, a supplemental cage, means for connecting the two cages with their interiors in communication and means for supporting the two cages upon the cone.

10. In a device of the kind described, a cage, a supplemental cage, and means for connecting the two cages with their interiors in communication, comprising extensions from one cage that overlap a portion of the other cage.

11. In a device of the kind described, a cage, a supplemental cage, and means for connecting the two cages with their interiors in communication, comprising parallel extensions from the introducing cage between which a portion of the supplemental cage extends.

12. A queen introducing device having a queen-confining chamber with a passage leading to the outside having queen excluder which permits the passage of worker bees.

13. A queen introducing device having a queen confining chamber closed on all sides but one, and having a passage leading to the outside with a queen excluder that permits the passage of worker bees, and means for supporting such chamber with the open side towards the comb.

In testimony whereof we hereunto affix our signatures.

JAY SMITH.
ERNEST R. ROOT.